Oct. 13, 1931.  C. BECKER  1,827,134
BAKERY MACHINERY
Filed June 18, 1930  2 Sheets-Sheet 1
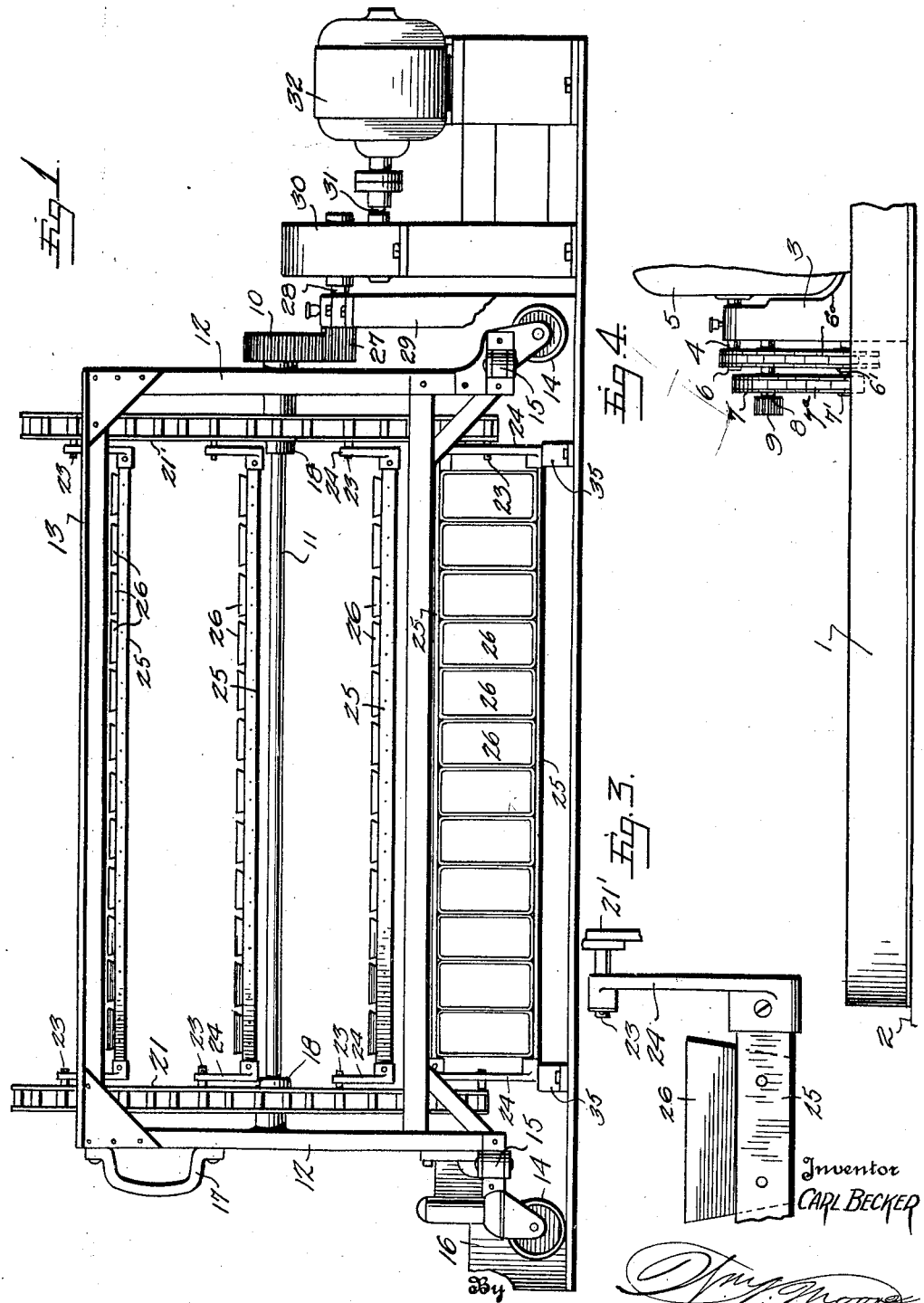
Inventor
CARL BECKER

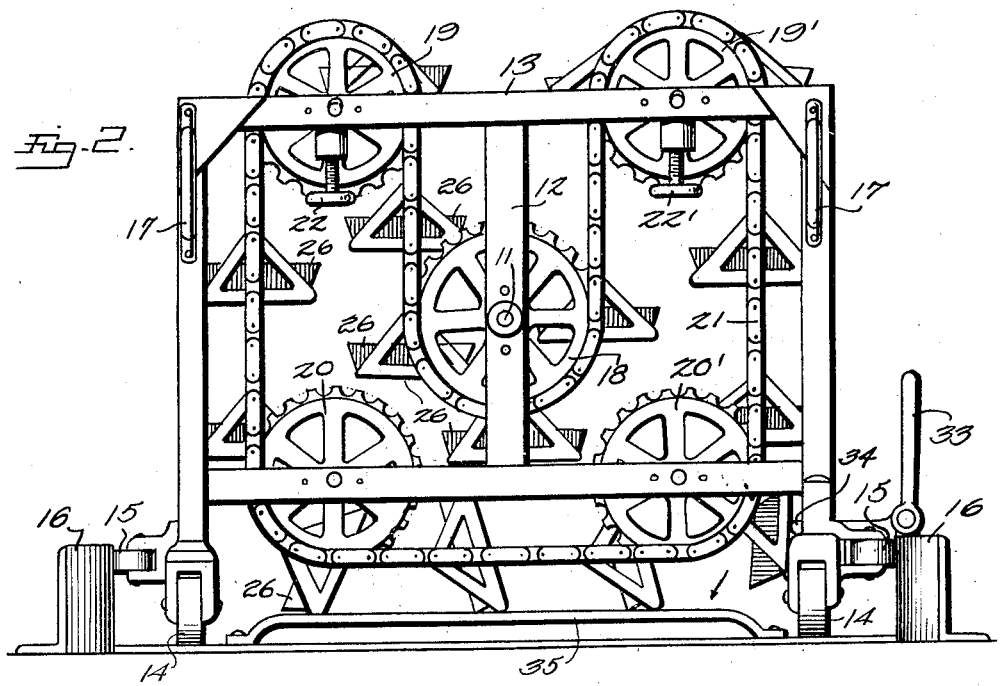
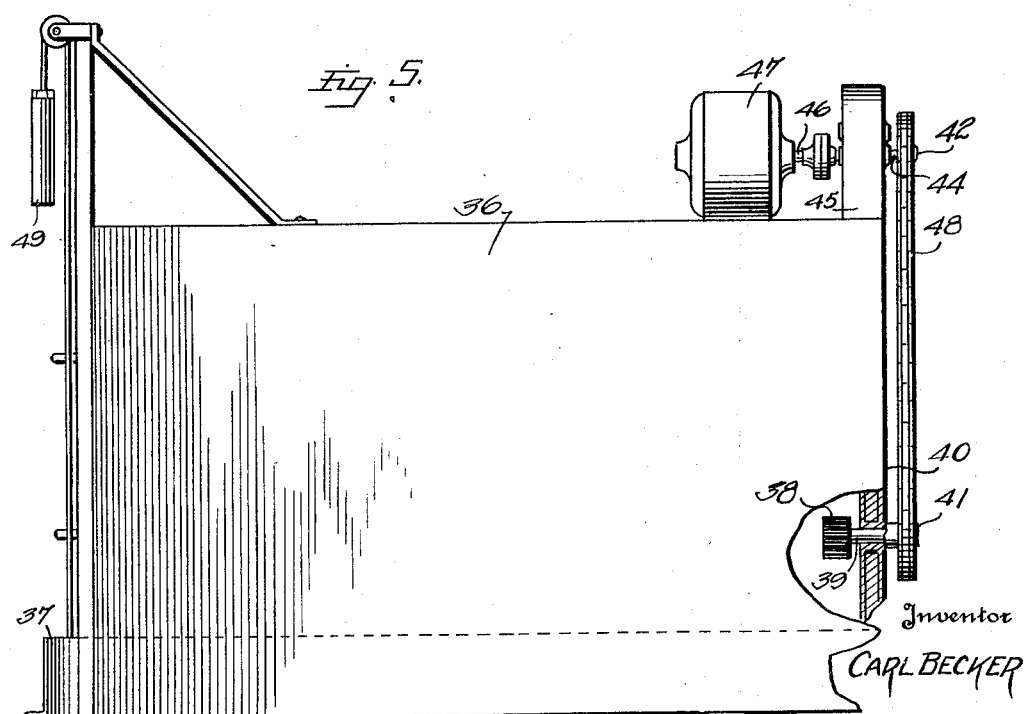

Patented Oct. 13, 1931

1,827,134

UNITED STATES PATENT OFFICE

CARL BECKER, OF NASHVILLE, TENNESSEE, ASSIGNOR OF ONE-FOURTH TO ROBERT E. GARRETT, OF NASHVILLE, TENNESSEE

BAKERY MACHINERY

Application filed June 18, 1930. Serial No. 462,022.

My invention relates to improvements in bakery machinery, and one object of my invention is the provision of machinery or equipment which will rapidly and easily handle a large number of loaves of bread and which will conduct the loaves to the ovens where the baking will be effected in a most satisfactory manner and thus insure a great saving in time and produce the most excellent results.

Another object of my invention is the provision of machinery or equipment which will have a very large handling capacity while occupying a small amount of space and being easily managed or controlled.

Another object of my invention is the provision of bakery equipment which will be absolutely certain and reliable in operation in first preparing the loaves for baking and which will then introduce the loaf carrying machinery to the oven where it will be operated to expose the loaves in the best manner to properly bake the said loaves.

Another object of my invention is the provision of machinery of the character and for the purpose stated which will be of comparatively simple and inexpensive construction, which will be durable to withstand the hard usage to which such mechanism would be subjected and which in every particular will prove efficient and practical.

To attain the objects stated, my invention broadly considered consists of means for receiving and supplying the dough in the form of loaves, means to operate said dough-receiving means, and an oven having means for rotating the loaf-carrying mechanism while in the process of baking to insure an even and rapid baking of the bread.

The invention further consists in mechanism of the character and for the purpose designed embodying novel features of construction and combinations of parts for service substantially as described and claimed and as shown in the accompanying drawings; in which:

Figure 1 represents a side elevation of the endless carrier mechanism which receives and travels with the loaves and the operating mechanism for said endless carrier mechanism.

Fig. 2 represents a front end view of the frame with endless carrier mechanism.

Fig. 3 represents a detail view of one of the swinging hangers with bread pan forming one element or part of the endless carrier mechanism.

Fig. 4 represents a side view of the moulder trough or receptacle with its driving or operating mechanism, and Fig. 5 represents a side view of the oven, partly broken away in its rear wall to disclose the driving mechanism for operating the endless carrier when in place in said oven.

The invention comprises in the order described, a moulding frame or receptacle in which the loaves are first placed in the pan, an endless carrier mechanism in which the loaves are placed for baking, an oven in which said endless carrier mechanism is manually pushed into and out of, and mechanism in the oven, the moulding frame and associated with said endless carrier, for imparting travel to said endless carrier, to facilitate the feeding of the loaves to the carrier, the rotating of the carrier when the loaves are in the oven, and finally the delivery of the baked loaves to a suitable discharging or conveying mechanism.

In describing the invention, the parts are referred to by numerals, the same numbers of reference being employed to designate the same parts in all the views of said drawings.

The moulder frame or receptacle consists of a pair of tracks or guides 1, rising from a bed or base 2, from one end of which projects a standard 3, in which is mounted the shaft 4, of the motor 5, which through the pair of sprocket wheels 6 and 6', and 7 and 7' rotate the stud 8, carrying the pinion 9, which is adapted to mesh with the larger pinion 10 on shaft 11, journalled in the vertical rails 12 of the rectangular frame 13, said sprocket wheels 6 and 6' and 7 and 7' being rotated by means of the sprocket chain 6a and the sprocket chain 7a.

The frame 13 is provided with rollers or casters 14, and with guide rollers 15 to bear or travel against the guide rail 16 to insure said frame moving in a proper line when pushed manually back and forth by means of the handles 17.

On said central shaft 11, near its outer ends, are mounted the sprocket wheels 18, and in the frame at each side of said sprocket wheels are mounted the upper pair of sprocket wheels 19 and 19' and the lower pair of sprocket wheels 20 and 20', which rotate through the medium of the endless sprocket chains 21 and 21', said sprocket wheels 19 and 19' being provided with tension screws 22 and 22' whose function is to keep said chains 21 and 21' in a taut or tight condition.

To the said chains 21 and 21' at proper intervals are placed studs or pins 23, to which are hung brackets 24, secured to the ends of plates or rails 25 in which are mounted the pans 26, which receive the loaves of bread.

The pinion 10, is adapted to either mesh with the pinion 9, to rotate the shaft 11, to bring the series of pans into position to be filled, or with the pinion 27, on stud 28, bearing in standard 29, said stud 28, passing through reduction box 30, and thence to shaft 31 of the motor 32, to cause the travel of the endless chain with bread carriers to deliver the baked loaves to a suitable conveyor, the said bread carriers being pivoted and having the proper movement so that when they reach the place of delivery of the bread at the lower end of the frame, the angle lever 33, has its arm 34 manually brought into contact with a pan carrier or pan, causing the series to tilt, as shown in Fig. 2, and dropping the loaves from the pan upon a proper conveyor, and the pair of bars 35, act to guide the pans during their dumped position, as most clearly shown in Fig. 2.

After the pans have been filled from the moulder the frame with its endless carrier is moved into the oven 36, the rollers 15 serving to guide the said frame by contact with the pair of tracks 37, in the oven, until the pinion 10 on central shaft 11 is brought into mesh with the pinion 38, on stud 39, mounted in the rear wall 40, of the oven 36.

On said stud 39, is a sprocket wheel 41, in line with a sprocket wheel 42, on shaft 44, in reduction box 45, to shaft 46, of motor 47, said sprocket wheels 41 and 42 receiving the sprocket chain 48, for driving the gear wheel 38, and the oven is provided at its front with a sliding door having a counterweight 49, to assist in opening and closing said door.

From the foregoing description taken in connection with the drawings, the operation of the parts or elements which comprise my mechanism will be readily understood and it will be noted that the endless bread carrying mechanism is first placed in the moulder trough or frame where the dough is placed in the pans during the rotation and when filled the endless carrier is moved into contact with its operating mechanism to allow the carrier to rotate while the dough is rising to the proper extent before being placed in the oven and after the dough has properly risen, the frame with its charge of loaves is moved into the oven until the operating mechanism carried by the oven is brought into coaction with the operating mechanism of the endless carrier, and the carrier is rotated by said oven mechanism and the bread is properly baked and when the baking is completed, the frame with endless carrier is moved into operative position to cause rotation of shaft 11 to cause the travel of the endless carrier to deliver the completed baked loaves upon a suitable conveyor, thus the machine performs the operations of feeding, rising, baking and delivering the bread in a joint mechanism, which will commend itself to all persons conversant with the industry as a most desirable, efficient and practical invention.

Among the most important features of my invention may be mentioned, the bed or platform which forms a part of the three elements of my invention, which bed or platform is provided with vertical tracks or guides against which travel the vertical and horizontal casters of the frame as this insures a perfect and certain travel and guiding of the frame and insures the bringing of the driving gear of the endless carrier into mesh under all conditions with the driving gear operated from the motor.

Another important feature resides in the construction stated, and in the manually operated lever for tilting the carriers with the pans of dough to deliver them in baked condition to the platform below the frame and from which they are taken for distribution.

I claim:

1. In baking machinery of the character described, the combination of an oven having a base or bed, vertical tracks upon said bed forming guides, a frame having vertical and horizontal casters for traveling upon the bed and guides, a motor driven shaft extending through the rear wall of said oven, a gear wheel on the inner end of said shaft, a driving shaft mounted in said frame and having one end extended, a gear wheel on said end adapted to mesh with the gear wheel on the motor driven shaft in the oven, and an endless carrier operated from said driving shaft, a series of pan containers connected to said endless carrier.

2. In baking machinery of the character described, the combination of a base or platform, vertical tracks on said platform forming guides, a frame having vertically and horizontally disposed casters travelling on said platform and guides, a vertical support at one end of said platform, a short horizontal shaft passing through and bearing in said vertical support and having each end projecting beyond each side of said vertical support, a gear wheel on each extended end of said shaft, a motor arranged to transmit motion to the gear wheel on the outer extended end of said shaft, a driving shaft mounted in said frame and having one end extended beyond said frame, a gear wheel on said extended end of said shaft adapted to mesh with the gear wheel on the inner extended end of said short horizontal shaft, an endless carrier arranged in said frame and operated by said shaft in the frame, and a series of pan containers pivotally supported in said endless carrier.

In testimony whereof I affix my signature.

CARL BECKER.